(12) United States Patent
Tregellas et al.

(10) Patent No.: US 8,599,362 B2
(45) Date of Patent: Dec. 3, 2013

(54) RANGEFINDER WITH HEAD COVERING ATTACHMENTS

(76) Inventors: Brian Tregellas, Newport, WA (US); David Fisher, Newport, WA (US)

( * ) Notice: Subject to any disclaimer, the term of this patent is extended or adjusted under 35 U.S.C. 154(b) by 231 days.

(21) Appl. No.: 13/169,308

(22) Filed: Jun. 27, 2011

(65) Prior Publication Data
US 2012/0327389 A1 Dec. 27, 2012

(51) Int. Cl.
*G01C 3/00* (2006.01)
*G01C 3/08* (2006.01)

(52) U.S. Cl.
USPC .............. 356/3; 356/3.01; 356/4.01

(58) Field of Classification Search
USPC .......................................... 356/3
See application file for complete search history.

(56) References Cited

U.S. PATENT DOCUMENTS

| | | | | |
|---|---|---|---|---|
| 5,822,048 A * | 10/1998 | Feinbloom | | 356/21 |
| 6,028,710 A * | 2/2000 | Jensen | | 359/630 |
| 2005/0186985 A1 * | 8/2005 | Im et al. | | 455/550.1 |
| 2011/0021293 A1 * | 1/2011 | York et al. | | 473/407 |

* cited by examiner

Primary Examiner — Tarifur Chowdhury
Assistant Examiner — Sunghee Y Gray
(74) Attorney, Agent, or Firm — The Law Office of Jerry D. Haynes

(57) ABSTRACT

A rangefinder with a head covering attachment comprising a housing, where the housing includes a front face, a back face, a first side wall, a second side wall, a top surface and a bottom surface; a laser window on the front face; a reader window next to the laser window on the front face; a lens attached to a side of the front face at a bottom edge, where the lens moves from an open position to a closed position; a hinge to fasten the lens to the housing; a receiving means positioned on the top surface; and a clip, where the clip includes a top arm and a bottom arm; wherein the clip connects to the receiving means to thereby attach the housing to a bill of the head covering to position the rangefinder directly in front of a user's face.

8 Claims, 2 Drawing Sheets

RANGEFINDER WITH HEAD COVERING ATTACHMENTS

BACKGROUND OF THE INVENTION

1. Field of the Invention

The present invention relates to a rangefinder with a modified top surface to receive a clip therefore allowing the rangefinder to attach to a head covering of a user.

2. Description of Related Art

Accuracy is a key component is many activities such as hunting, golf and archery. Specifically, knowing the distance to the target may greatly assist the performer when they are trying to set up a shot. Knowledge of the distance between the person and the target tells the person how hard to strike the ball, how far to pull the bow or how to angle the gun. With practice, the person is able to fine tune their abilities so that when the exact distance is known they situate their bodies and equipment to perform their most accurate shot.

Currently, there are a variety of rangefinders to assist users when determining the distance between themselves and the target. Most of the common rangefinders are handheld devices wherein the user holds the device with either one or both hands. With the handheld rangefinders the user cannot perform more than one task at a time. The user must first hold the rangefinder, put it down and then pick up their other equipment to perform their desired activity. Some rangefinders have been modified to attach near the eyepiece of a gun, and therefore the user is able to both determine the distance to the target while simultaneously aiming. The user does not have to fumble with switching between the handheld rangefinder to their gun. While these gun mounted rangefinders are handy tools for hunters, golfers and archers still must use the handheld devices when wanting to find their target distances.

Therefore it would be beneficial in the art to provide a rangefinder that allows for handless operation to determine the distance to a target. It would also be desirable in the art to provide a rangefinder that includes a modified screen for easier viewing by the user without using their hands.

SUMMARY OF THE INVENTION

In view of the foregoing disadvantages inherent in the prior art, the general purpose of the present invention is to provide a rangefinder with a head covering attachment, configured to include all of the advantages of the prior art, and to overcome the drawbacks inherent therein.

Accordingly, an object of the present invention is to provide a rangefinder that attaches to a bill of a head covering to allow a user to use the rangefinder without their hands.

Another object of the present invention is to provide a rangefinder that is removable from the head covering so that accommodates a variety of different users and activities.

Another object of the present invention is to provide a rangefinder with a flip-down lens to display the distance to the target directly in front of the user's face while attached to the head covering.

To achieve the above objects, in an aspect of the present invention, a rangefinder with a head covering attachment is disclosed comprising a housing, where the housing includes a front face, a back face, a first side wall, a second side wall, a top surface and a bottom surface; a laser window on the front face; a reader window next to the laser window on the front face; a lens attached to a side of the front face at a bottom edge, where the lens moves from an open position to a closed position; a hinge to fasten the lens to the housing; a receiving means positioned on the top surface; and a clip, where the clip includes a top arm and a bottom arm; wherein the clip connects to the receiving means to thereby attach the housing to a bill of the head covering to position the rangefinder directly in front of a user's face.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DRAWINGS

The present invention relates to a rangefinder with a modified top surface to receive a clip therefore allowing the rangefinder to attach to a head covering of a user. The present invention provides a rangefinder with a pair of removable clips to enable the user to determine their distance from a desired target. The rangefinder includes a flip down lens with a crosshair marking and a digital display to illuminate the distance to the target. By attaching the rangefinder to the head covering the user is able to operate the rangefinder without their hands therefore allowing them to simultaneously perform another activity.

Figure 1:
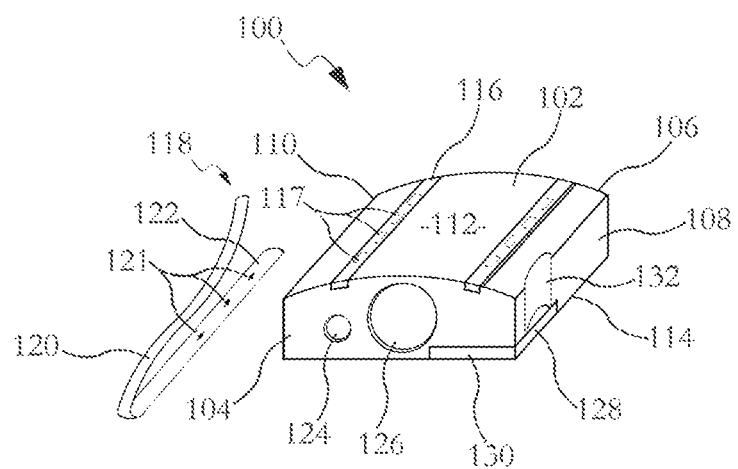
FIG. 1 depicts a perspective view of a rangefinder with a clip in accordance with an exemplary embodiment of the present invention.

Turning now descriptively to the drawings, referring to FIG. 1, a perspective view of a rangefinder (100) with a clip (118) is shown in accordance with an exemplary embodiment of the present invention. The rangefinder (100) includes a housing (102) to contain a plurality of internal components that operate the rangefinder (100). The housing (102) comprises a front face (104), a back face (106), a first side wall (108), a second side wall (110), a top surface (112) and a bottom surface (114). The shape of the housing (102) may be generally cubed or rectangular. The top surface (112) may be slightly curved or bowed, whereas the other surfaces are flat. The top surface (112) is curved to better fit under the bill of a head covering (later shown in FIG. 4). The housing (102) may be made from a lightweight plastic or aluminum material for easy transportability and mounting.

The clip (118) includes a top arm (120) and a bottom arm (122). The clip (118) comprises a V-shape wherein the top arm (120) and the bottom arm (122) meet at a common end. The bottom arm (122) is a straight piece with a plurality of engaging members (121) (hereinafter engaging members) aligned along a top portion. The top arm (120) may be a curved piece that curves away from the bottom arm (122) at the end opposite where the top arm (120) and the bottom arm (122) meet.

On the top surface (112) may be a pair of receiving means (116) (hereinafter receiving means) that extend from the front face (104) to the back face (106) along the top surface (112). A plurality of coordinating engaging members (117) (hereinafter coordinating engaging members) may be aligned along the receiving means (116) to engage the engaging members (121) fastened to the bottom arm (122). When the engaging members (121) receive the coordinating engaging members (117), the clip (118) locks in place against the receiving means (116).

The receiving means (116) may be slots to receive the bottom arm (122), wherein the engaging members (121) are buttons and the coordinating engaging members (117) are holes in the slotted receiving means (116). Alternatively, the coordinating engaging members (117) may be buttons while the engaging members (121) are button holes, wherein the buttons on the housing (102) press into the button holes on the bottom arm (120) to connect the clip (118) against the top surface (112). When the bottom arm (122) engages with the receiving means (116) the top arm (120) of the clip (118) rests above the top surface (112) of the housing (102).

On the front face (104) is a laser window (124) positioned next to a reader window (126). The laser window (124) and the reader window (126) provide an outlet for the internal laser and reader to read and measure the distances of far away objects. A hinge (130) is attached to the bottom edge of the front face (104) is a lens (128). The hinge (130) may be fastened along a side of the front face (104). The lens (128) may switch between a closed position (as shown) wherein the lens (128) tucks against the bottom surface (114), and an open position (shown in FIG. 3) wherein the lens (128) extends down from the front face (104) perpendicular to the bottom surface (114). When the lens (128) is in the open position the rangefinder (100) is on, and when the lens (128) is in the closed position the rangefinder (100) is off.

A finger groove (132) may be placed on the first side wall (108) above where the lens (128) rests against the bottom surface (114). The finger groove (132) provides a depression in the housing (102) so that when a user slides their finger along the finger groove (132) they catch the lens (128) to flip it down into the open position.

Figure 2:
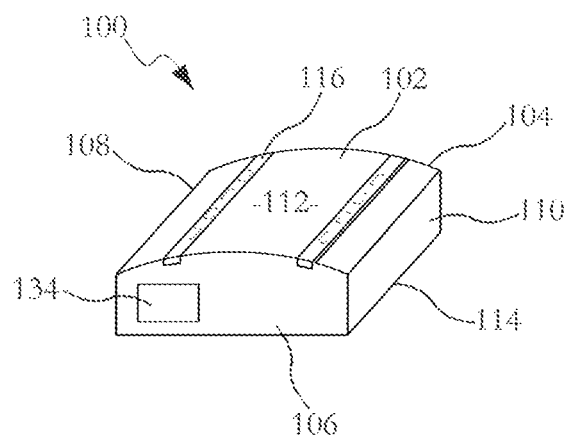
FIG. 2 depicts a backside view of a rangefinder in accordance with an exemplary embodiment of the present invention.

Referring to FIG. 2, a backside view of the rangefinder (100) is shown in accordance with an exemplary embodiment of the present invention. The back face (106) of the housing (102) may include a battery pack (134). The battery pack (134) contains the batteries needed to power the rangefinder (100)

Figure 3:
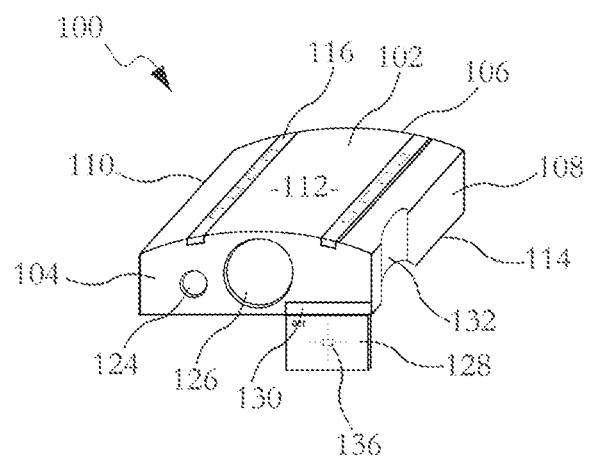
FIG. 3 depicts a perspective view of a rangefinder in an open position in accordance with an exemplary embodiment of the present invention.

Referring to FIG. 3, a perspective view of the rangefinder (100) is shown in the open position in accordance with an exemplary embodiment of the present invention. FIG. 3 illustrates the lens (128) in the open position, wherein the lens (128) flips down from the hinge (130) attached to the front face (104) of the housing (102). On a central portion of the lens (128) may be a crosshairs marking (136). The crosshairs marking (136) provides a permanent pointer where the user focuses their vision when looking through the lens (128). The lens (128) may include a digital distance display to inform the user of the distance to the desired item in the crosshairs marking (136).

Figure 4:
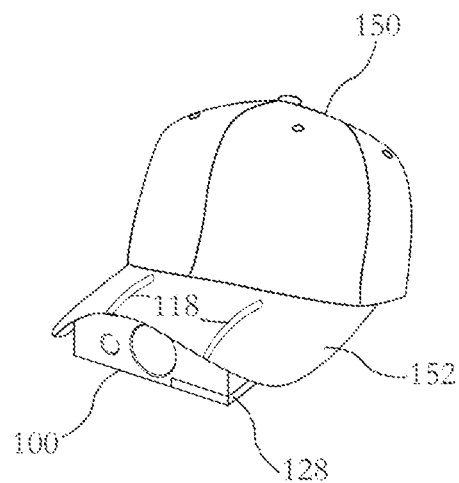
FIG. 4 depicts a perspective view of a rangefinder and a head covering in accordance with an exemplary embodiment of the present invention.

Finally referring to FIG. 4, a perspective view of the rangefinder (100) and a head covering (150) are shown in accordance with an exemplary embodiment of the present invention. The rangefinder (100) is attached to a bill (152) of the head covering (150) with a pair of clips (118). The head covering (150) may be a baseball cap, a hunting hat, a visor or the like each sharing the common feature of the bill (152). The bill (152) positions the rangefinder (100) in an ideal position in front of the user's face, so that when the lens (128) is in the open position the user may easily view the necessary readings on the lens (128). The rangefinder (100) is especially helpful for users during archery, hunting, golfing or surveying by allowing the participants to use the rangefinder without occupying their hands to hold the device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A rangefinder with a head covering attachment comprising:
   a housing, where the housing includes a front face, a back face, a first side wall, a second side wall, a top surface and a bottom surface;
   a laser window on the front face;
   a reader window next to the laser window on the front face;
   a lens attached to a side of the front face at a bottom edge, where the lens moves from an open position to a closed position, where in the open position the lens extends down from the housing and where in the closed position the lens rests against the bottom surface, wherein the first side wall includes a finger groove to allow the user to pull the lens thereby moving the lens from the closed position to the open position;
   a hinge to fasten the lens to the housing, where the hinge enables the lens to move;
   a receiving means positioned on the top surface; and
   a clip, where the clip comprises:
      a top arm; and
      a bottom arm, where the bottom arm and the top meet at a common end;
   wherein the bottom arm of the clip connects to the receiving means to thereby attach the housing to a bill of the head covering to position the rangefinder directly front of a user's face.

2. The rangefinder with a head covering attachment according to claim 1, wherein the housing includes a battery pack on the back face.

3. The rangefinder with a head covering attachment according to claim 1, wherein the lens includes a crosshair marking to focus the user's view.

4. The rangefinder with a head covering attachment according to claim 2, wherein the lens includes a digital distance display to show the user a distance to a desired object.

5. The rangefinder with a head covering attachment according to claim 1, wherein the receiving means is a slot to receive the bottom arm of the clip.

6. The rangefinder with a head covering attachment according to claim 4, wherein the bottom arm of the clip includes a plurality of engaging members and the slot includes a plurality of coordinating engaging members to connect the clip to the housing.

7. The rangefinder with a head covering attachment according to claim 1, wherein the head covering is one of at least a baseball cap, a hunting hat and a visor.

8. The rangefinder with a head covering attachment according to claim 1, wherein the housing includes two receiving means to utilize two clips to attach the housing to the bill.

* * * * *